(12) United States Patent
Cummins et al.

(10) Patent No.: US 6,263,427 B1
(45) Date of Patent: Jul. 17, 2001

(54) BRANCH PREDICTION MECHANISM

(75) Inventors: Sean P. Cummins, Sunnyvale; Kenneth K. Munson, Saratoga, both of CA (US)

(73) Assignee: Rise Technology Company, Santa Clara, CA (US)

( * ) Notice: Subject to any disclaimer, the term of this patent is extended or adjusted under 35 U.S.C. 154(b) by 0 days.

(21) Appl. No.: 09/146,995

(22) Filed: Sep. 4, 1998

(51) Int. Cl.$^7$ ....................................... G06F 9/38
(52) U.S. Cl. .................. 712/236; 712/237; 712/238; 712/239; 712/240; 712/241
(58) Field of Search ................... 712/236, 237, 712/238, 239, 240, 241

(56) References Cited

U.S. PATENT DOCUMENTS

| | | |
|---|---|---|
| 5,265,213 | 11/1993 | Weiser et al. . |
| 5,604,877 | 2/1997 | Hoyt et al. . |
| 5,606,676 | 2/1997 | Grochowski et al. . |
| 5,608,885 | 3/1997 | Gupta et al. . |
| 5,619,730 | 4/1997 | Ando . |
| 5,696,958 | 12/1997 | Mowry et al. . |
| 5,737,562 | 4/1998 | Caulk, Jr. . |

OTHER PUBLICATIONS

Yeh et al., "Two–Level Adaptive Branch Prediction," *The 24th ACM/IEEE International Symposium and Workshop on Microarchitecture*, (Nov. 1991) pp. 51–61.

Yeh et al., "Increasing the instruction Fetch Rate Via Multiple Branch Prediction and a Branch Address Cache", *Proceedings of the 1993 International Conference on Supercomputing*, ACM, pp. 67–76, Jul. 19–23, 1993.*

Seznec et al., "Multiple–Block Ahead Predictors", *Proceedings of the Seventh International Conference on Architectural Support for Programming Languages and Operating Systems*, ACM, pp. 116–127, Oct. 1–4, 1996.*

* cited by examiner

Primary Examiner—William M. Treat
(74) Attorney, Agent, or Firm—Oblon, Spivak, McClelland, Maier & Neustadt, P.C.

(57) ABSTRACT

A branch prediction mechanism for predicting the outcome and the branch target address of the next possible branch instruction of a current instruction. Each of the entry of the branch target buffer ("BTB") of the present invention provides a next possible branch instruction address, and the corresponding branch target address. By checking the TAG portion of each entry of the BTB with the current instruction address, the branch prediction mechanism can predict the next possible branch instruction and the corresponding branch target address.

23 Claims, 15 Drawing Sheets

| LABEL | OPERATION | PARAMETERS |
|---|---|---|
| Begin | Load | R1,#3 |
| Loop | Add | R2,R1 |
|  | Decrement | R1 |
| Go Back | Branch, if not zero | Loop |
| Done | Store | R2, Memory |

Figure 5

| TAG | Target Addr. | Pred. Val. |
|---|---|---|
|  |  |  |
|  |  |  |

Prior Art
Figure 11

| TAG | Jump Addr. | Target Addr. | Pred. Val. |
|---|---|---|---|
|  |  |  |  |
|  |  |  |  |

Figure 12

BRANCH PREDICTION MECHANISM

CROSS REFERENCE TO RELATED APPLICATION

This application is related to the following copending, commonly assigned U.S. patent application, which is incorporated entirely by reference herein:

U.S. Ser. No. 09/148,638, filed Sep. 4, 1998 entitled "Improved Instruction Buffering Mechanism," by Kenneth K. Munson et al.

BACKGROUND OF THE INVENTION

The present invention relates to computer processor having branch target buffer(s) for improving performance of branch instruction execution. The invention is useful for pipelined and non-pipelined architectures. For the pipelined architectures, this invention is useful for both single and superscalar pipelined architectures that have two or more pipelines for processing instructions.

The original computers were designed to completely process one instruction before beginning the next instruction in the sequence. Major architectural advances that have increased performance include the use of pipelined and superscalar architectures. These architectures introduce higher levels of design complexity and cost in the computer processors, however this additional cost is more than offset by the increased performance of pipelined and superscalar computers.

Performance can also be increased by use of caches in computer architectures. Caches are utilized to store and supply often used information such as data and instructions. Within one clock cycle, a cache can supply the needed information without the memory access that could consume several cycles. One example of a cache that increases performance during a branch instruction is termed a branch target buffer ("BTB").

As mentioned briefly above, the speed of computers is increased by pipelining instructions. A pipelined computer divides instruction processing into a series of steps, or stages, each of which is preferably executable in a single clock cycle. In a non-pipelined computer, each instruction is processed until it is complete and only then does processing begin on the next instruction. In a pipelined computer, several sequential instructions are processed simultaneously in different stages of the pipeline. Processing in the different processing stages may proceed simultaneously in one clock period in separate portions of the computer.

For example, in a computer processor running pipeline instructions, each stage of the operation is handled in one clock period. The stages into which instruction processing for the processor are divided include an instruction cache fetch stage for fetching the instruction from wherever it is stored, an instruction decode stage for decoding the instruction, an address generation stage for generating the operand address(es), an operand fetch stage for fetching the operands, an execution stage for executing the instruction, and a writeback stage for writing the results of the execution to the registers and memory for later use. Each of the stages is designed to occupy one clock period. Thus during the first clock period, the instruction fetch portion of the computer fetches an instruction from storage and aligns it so that it is ready for decoding. During the second clock period, the instruction fetch portion of the computer fetches the next instruction from storage and aligns it, while the instruction decoder portion of the computer decodes the first instruction fetched. During the third clock period, the first instruction fetched is moved into the instruction issue stage while the second instruction fetched is moved into the instruction decode stage, and another instruction is moved into the instruction fetch stage. Pipelining continues through each of the stages including the execution stage and the writeback stage, and thus the overall speed of computer processing is significantly increased over a non-pipelined computer.

In a superscalar architecture, two or more instructions may be processed simultaneously in one stage. A superscalar computer has two or more processing paths that are capable of simultaneously executing instructions in parallel. In a scalar computer, the same type of instructions would be run serially. It should be apparent that if two or more instructions are run simultaneously, then the computer can process instructions faster.

If a branch instruction, such as a jump, return, or conditional branch, is in the series of instructions, a pipelined computer will suffer a substantial performance penalty on any taken branch unless there is some form of branch prediction. The penalty is caused on a taken branch because the next instructions following in the pipeline must be thrown away, or "flushed." For example, if the microarchitecture has three stages preceding an execution stage, then the penalty will be at least three clock cycles when a branch is taken and not predicted, assuming the branch is resolved in the execution stage. This penalty is paid when the incorrect instructions are flushed from the pipeline and the correct instruction at the actual target address is inserted into the pipeline.

One way to increase the performance of executing a branch instruction is to predict the outcome of the branch instruction, and insert the predicted instruction into the pipeline immediately following the branch instruction. If such a branch prediction mechanism is implemented in a microprocessor, then the penalty is incurred only if the branch is mispredicted. It has been found that a large number of the branches actually do follow the predictions. That this is so can be exemplified by the prevalence of repetitive loops. For example, it may be found that 80% of the branch predictions are correct.

Several types of branch prediction mechanisms have been developed. One type of branch prediction mechanism uses a branch target buffer (i.e. "BTB") that stores a plurality of entries including an index to a branch instruction. In addition to the index, each entry of the BTB table may include an instruction address, an instruction opcode, history information, and possibly other data. In a microprocessor utilizing a branch target buffer, the branch prediction mechanism monitors each instruction as it enters into the pipeline. Specifically, each instruction address is monitored, and when the address matches an entry in the branch target buffer, then it is determined that instruction is a branch instruction that has been taken before. After the entry has been located, the history information is tested to determined whether or not the branch will be predicted to be taken. Typically, the history is determined by a state machine which monitors each branch in the branch target buffer, and allocates bits depending upon whether or not a branch has been taken in the preceding cycles. If the branch is predicted to be taken, then the predicted instructions are inserted into the pipeline. Typically, the branch target entry will have opcodes associated with it for the target instruction, and these instructions are inserted directly into the pipeline. Also associated with the branch target buffer entry is an address that points to the predicted target instruction of the branch. This address is used to fetch additional instructions.

Processing the branch instruction and each following instruction then proceeds down the pipeline for several clock cycles until the branch instruction has completed the execution stage, after which the "takeness" of the branch is known. If the branch is taken, the actual branch target address of the branch will be known. If the branch has been correctly predicted, then execution will continue in accordance with the prediction. However, if the branch has been mispredicted, then the pipeline is flushed and the correct instruction is inserted into the pipeline. In a superscalar computer, which has two or more pipelines through which instructions flow side-by-side, the performance penalty on a misprediction is even greater because, in most cases, at least twice the number of instructions may need to be flushed.

As the instruction issue rate and pipeline depth of processors increases, the accuracy of branch prediction becomes an increasingly significant factor in performance. Many schemes have been developed for improving the accuracy of branch predictions. These schemes may be classified broadly as either static or dynamic. Static schemes use branch opcode information and profiling statistics from executions of the program to make predictions. Static prediction schemes may be as simple as predicting that all branches are Not Taken or predicting that all branches are Taken. Prediction that all branches are Taken can achieve approximately 68 percent prediction accuracy as reported by Lee and Smith (J. Lee and A. J. Smith, "Branch Prediction Strategies and Branch Target Buffer Design", IEEE Computer, (January 1984), pp. 6–22). Another static scheme predicts that certain types of branches (for example, jump-on-zero instructions) will always be Taken or Not Taken. Static schemes may also be based upon the direction of the branch, as in "if the branch is backward, predict Taken, if forward, predict Not Taken". This latter scheme is effective for loop intensive code, but does not work well for programs where the branch behavior is irregular.

One method of static prediction involves storing a "branch bias" bit with each branch instruction. When the instruction is decoded, the "branch bias" bit is used to predict whether the branch is Taken or not. The bias bit is usually determined statistically by profiling the program with sample data sets, prior to execution. A profiling method is used to generate the branch bias bit. First the program is loaded into the computer memory. Starting with the first instruction in the program, a branch instruction is located. Instructions are added to the program to record branch decisions for the instruction. The program is then executed with a number of sample data sets. Execution is stopped, and beginning with the first instruction in the program each instruction is located. The profiling instructions are removed from the program, and if the probability that the branch will be Taken exceeds 50%, then the branch bias bit is set in the branch instruction and saved with the program. When the program is next executed, the bias bit is examined. If set, the branch is always predicted as Taken during execution of the program. Otherwise, the branch is always predicted as Not Taken.

A disadvantage of all static prediction schemes is that they ignore branch behavior in the currently executing program. By contrast, dynamic prediction schemes examine the current execution history of one or more branch instructions when making predictions. Dynamic prediction can be as simple as recording the last execution of a branch instruction and predicting the branch will behave the same way the next time. More sophisticated dynamic predictors examine the execution history of a plurality of branch instructions. Dynamic prediction typically requires more hardware than static prediction because of the additional run-time computation required.

In dynamic prediction, branch history information is applied to an heuristic algorithm. The heuristic algorithm inputs the branch execution history and outputs an indication of whether the branch will be Taken or Not Taken the next time it is executed. An example of a heuristic algorithm is one which counts the number of Taken and No Taken decisions in the last M branch decisions. If the number of Taken decisions or exceeds the number of Not-Taken decisions, the branch is predicted as Taken.

Dynamic prediction schemes may be further classified into local and global prediction schemes.

One method of local branch prediction uses a history table to record history information for a branch instruction. N bits of the instruction address are used to index an entry in the history table, where N is typically less than the number of bits in the branch instruction address. Because N is less than the number of bits in the branch instruction address, the history table serves as a hash table for all possible branch instructions in a program. Each entry of the history table stores the address of the branch for which the information in the entry is current. Storing the branch address in the entry makes it possible to detect hash-collisions when the address of a branch instruction does not match the address of the instruction for which the history information in an entry is current.

For the global prediction schemes, for example, each entry of the history table also contains an L bit branch sequence for a branch instruction, where L is a number of prior branch decisions to record for the branch. The L-bit branch sequence records whether the last L executions of the branch instruction resulted in the branch being Taken or Not-Taken. For example, if L=2 and the last two executions of the branch resulted in a Taken and a Not-Taken decisions, then the branch sequence is 10, where logical one (1) represents the Taken decision and logical zero (0) represents the Not-Taken decision. Each entry in the table also contains an array of 2L saturating up-down counters. For L=2, each entry also contains four saturating up-down counters, one counter for each of the four possible branch sequences. The possible sequences are: <Not-Taken, Not-Taken>, <Not-Taken, Taken>, <Taken, Not-Taken>, and <Taken, Taken>. In binary, these sequences are 00, 01, 10, and 11. Each counter counts the number of times a particular branch sequence results in a Taken decision when the branch is next executed. For example, counter 0 records the number of times the sequence 00 results in a branch decision of Taken when the branch instruction is next executed.

To predict whether a branch will be taken or Not Taken upon the next execution of the branch instruction, the count associated with the branch sequence for the instruction is examined by the prediction heuristic logic. A typical heuristic works as follows: if the count is greater than or equal to a predetermined threshold value, the branch is predicted Taken, otherwise the branch is predicted Not Taken. If the count has P bits of resolution, a typical threshold value is $2^{(P-1)}$, which is the midpoint of the range of a P-bit counter. Once the branch is executed, resulting in a branch decision, the branch decision is input to the history update logic. If the branch is Taken, the count for the branch sequence is incremented by one. Otherwise the count is decremented by one. If the count reaches $2^P-1$ (i.e. the counter is saturated), the count remains at that value as long as the branch is Taken on subsequent executions for the same history sequence. If the count reaches 0, it remains at zero as long as the branch is Not Taken on subsequent executions for the same history sequence. Once the count is updated, the branch sequence is updated with the result of the branch decision. The high-order bit is shifted out of the branch sequence, and the result of the branch decision is shifted on. If the branch is Taken, a 1 is shifted in, otherwise a 0 is shifted in.

As mentioned in the previous paragraphs, some conventional branch prediction mechanisms create pipeline stalls in the processing pipeline when the branch prediction is needed because of the complexity in determining the outcome of the branch instructions. These pipeline stalls greatly decrease the pipeline efficiency of the processing system, therefore, an advanced branch prediction mechanism is desirable to solve this problem.

SUMMARY OF THE INVENTION

Therefore, it is the object of the present invention to provide an instruction controlling method and apparatus for handling branch instructions in a processor. Specifically, the present invention discloses a branch prediction mechanism and method to predict the outcome of the next possible branch instruction before the branch instruction is being processed.

In accordance with a first aspect of the present invention, a branch prediction mechanism is provided in a pipeline processor for beginning to predict the outcome of the next possible branch instruction when a branch jump for a previous branch instruction is just taken.

Another aspect of the present invention is a novel design of the BTB table comprising a TAG portion for storing a just taken jump target address, a next possible branch instruction address, a next jump target address, and a prediction value of the next possible branch instruction.

A further aspect of the present invention is to allow the branch prediction mechanism to predict multi-level branch instruction so that not only the next possible branch instruction is predicted, but the next possible branch instruction is also predicted. This aspect of the present invention allows the branch prediction mechanism to foresee the prediction results of the next few branch instructions.

Additional objects, features and advantages of various aspects of the present invention will become apparent from the following description of its preferred embodiments, which description should be taken in conjunction with the accompanying drawings.

BRIEF DESCRIPTION OF THE DRAWINGS

FIG. 5 shows a simple computer program.

FIG. 11 shows a branch target buffer ("BTB") table of the conventional designs.

FIG. 12 shows a branch target buffer ("BTB") table of an embodiment of the present invention.

DETAILED DESCRIPTION OF THE DRAWINGS

Figure 1:
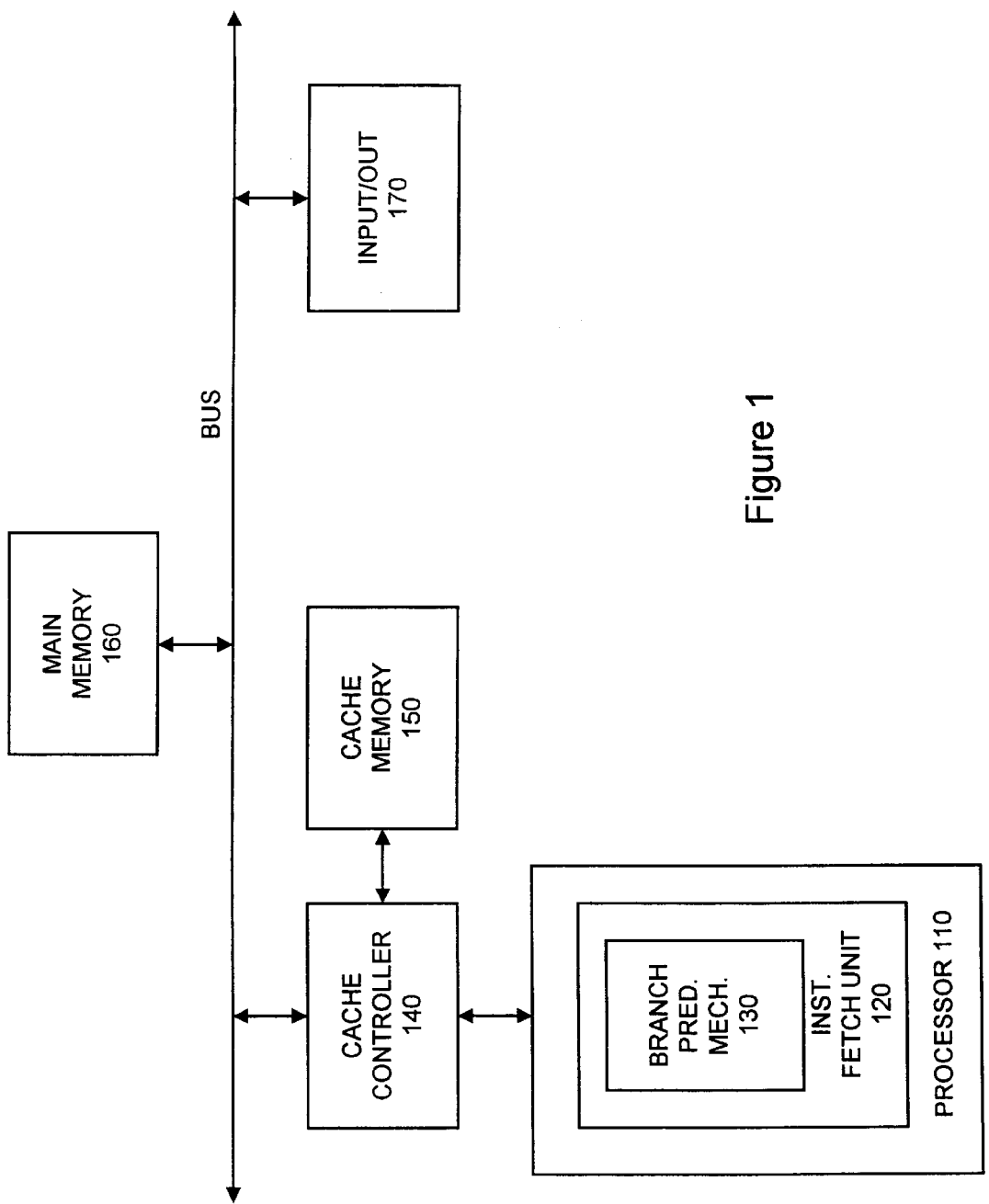
FIG. 1 shows a typical computer system employing a branch prediction mechanism.

FIG. 1 illustrates a typical computer system employing a branch prediction mechanism. The system as shown comprises a processor 110 having an instruction fetch unit 120 and a branch prediction mechanism 130, a cache memory system having a cache controller 140 and a cache memory 150, a main memory 160, and input/output devices 170. The branch prediction mechanism 130 is usually located inside the processor 110 for predicting proper instruction sequence for the processor 110. The predicted instructions are then fetched from the cache memory 150 or the main memory 160 for processing.

Figure 2:
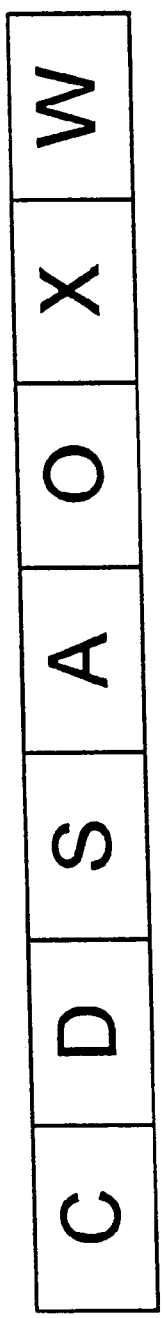
FIG. 2 shows a typical computer processing pipeline having different processing stages.

FIG. 2 shows an instruction pipeline of a typical computer system. The instruction pipeline as shown comprises seven sequential stages: instruction cache fetch ("C"), instruction decode ("D"), instruction issue ("S"), address generate ("A"), operand fetch ("O"), instruction execute ("X"), and registers writeback ("W").

IN the example as shown, when an instruction is assigned to the instruction pipeline for processing, the instruction is first fetched from the instruction cache or the main memory (i.e. cycle "C"). After the instruction is fetched, the processor then decodes the instruction (i.e. cycle "D"). The address fields of the instruction are then selected in the instruction issued stage (i.e. cycle "S"). In a superscalar processor design, the processor also determines any possible conflict between different pipelines in the cycle "S". The operand address(es) for that particular instruction is then generated for the subsequent operand fetch stage (i.e. cycle "A"). The operand(s) is then fetched in the next cycle (i.e. cycle "O"). After the operand(s) is fetched from the cache memory and/or the main memory, the processor executes the current instruction in cycle "X". After the instruction is executed, the data and/or registers are then writtenback to the corresponding locations (i.e. cycle "W"). Preferably, each of the seven stages is processed within one clock cycle for optimal pipeline performance.

Figure 3:
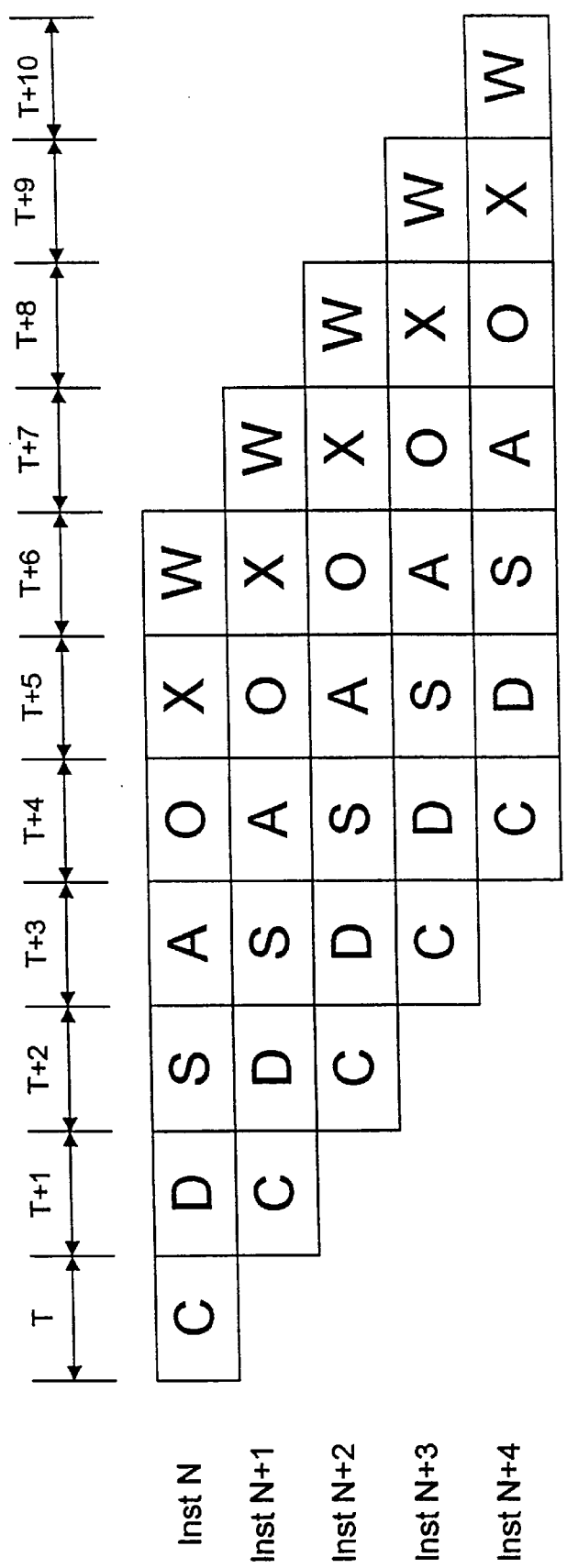
FIG. 3 shows the contents of different stages of a computer pipeline processing a sequence of instructions.

FIG. 3 shows the contents of different stages of the instruction pipeline when a sequence of instructions flows through the instruction pipeline of FIG. 2. The example as shown in FIG. 3 assumes that instructions are fetched one-by-one and that there are no pipeline stalls (i.e. "holes" in the pipeline stages). In addition, each pipeline stage is assumed to be completed within one clock cycle. At the end of each cycle, each instruction proceeds to the next stage of the pipeline and the next instruction takes over the current stage of the process.

For example, at the end of the clock cycle T, instruction N had just completed fetching the instruction (i.e. C stage) and proceeded to the instruction decode stage (i.e. D stage). At the same time, instruction N+1 then moved into the C stage of the processing pipeline. As a result, during the clock cycle T+1, two level processing pipeline was formed (i.e. Instruction N at D stage, and Instruction N+1 at C stage).

Similarly, at the end of the clock cycle T+1, instruction N had completed the instruction decode stage (i.e. D stage) and proceeded to the S stage. At the same time, instruction N+1 also completed the instruction fetch stage and entered the D stage of the pipeline. Furthermore, because instruction N+1 had completed the instruction fetch stage (i.e. C stage), instruction N+2 was allowed to enter and occupy the C stage of the processing pipeline at the beginning of the clock cycle T+2. Therefore, during the clock cycle T+2, three level processing pipeline is formed (i.e. Instruction N at the S stage, Instruction N+1 at the D stage, and Instruction N+2 at the C stage).

Instructions N+3, N+4, and so on entered the processing pipeline in a similar fashion. In the present example, it is important to note that each pipeline stage is preferably completed within one single clock cycle. Otherwise, if any of the stages takes more than one clock cycle, "holes" will be formed within the pipeline and the processor will be stalled while waiting for the preceding instruction to complete.

Figure 4:
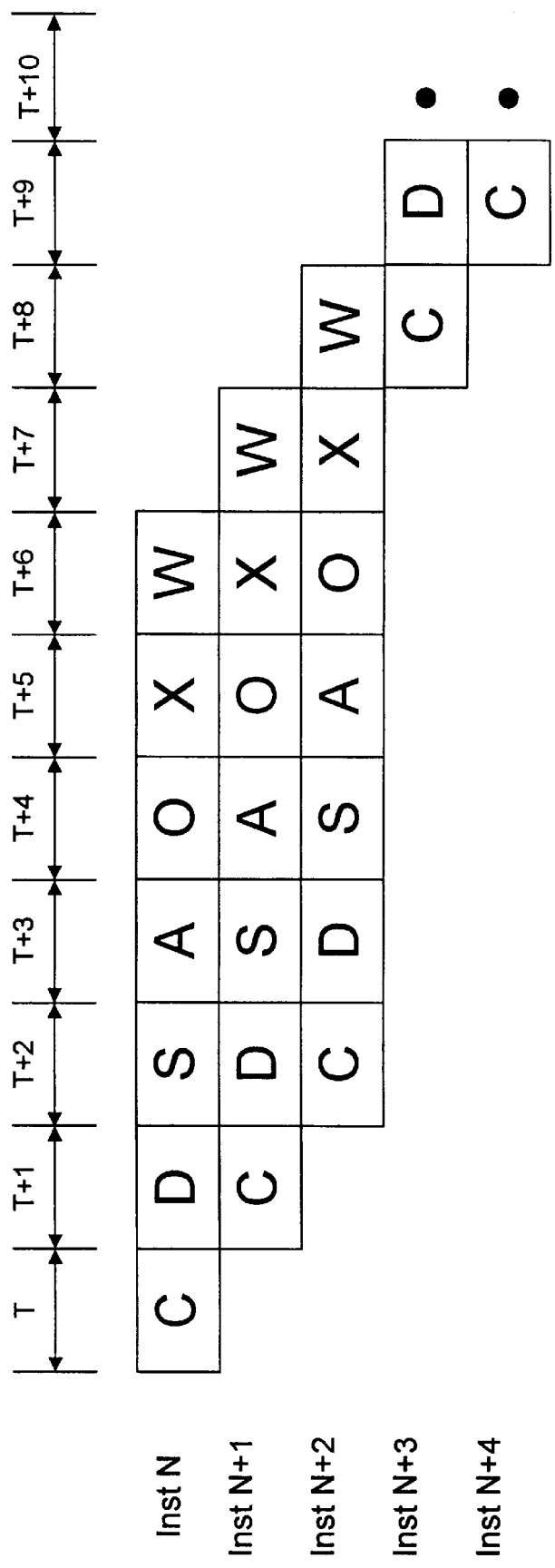
FIG. 4 shows the contents of different stages of a computer pipeline without a branch prediction mechanism while processing a sequence of instructions.

FIG. 4 shows the contents of different stages of an instruction pipeline, in one prior design, without a branch prediction mechanism when a sequence of instruction flows through the instruction pipeline of FIG. 2. In this processor design, branch conditions are not predicted. It is assumed that Instruction n+2 is a branch instruction (i.e. branch prediction needs to be made). As shown in the figure, because of the unresolved branch condition of Instruction N+2, Instruction N+3 cannot begin before Instruction N+2 is executed. Only after Instruction N+2 is executed and the branch condition is resolved, Instruction N+3 can begin its C stage of the processing pipeline.

FIG. 5 shows a simple program written in a pseudoassembly language for illustrating the abovementioned stage advancement performed inside the pipeline. The program comprises a very short loop. The first line of the program consists of a load instruction that loads a first register (R1) with the absolute value 3. The second line of the program contains an add instruction that adds the value of the first register (R1) to a second register (R2). The first register (R1) is then decremented in the third line of the program. In the fourth line of the program, the program branches back to the second line of the program if the zero flag has not been set. Thus if the first register (R1) does not yet contain the value 0, the program will loop back to the second line. Finally, in the fifth line of the program, the value in the second register (R2) is store to memory.

Figure 6:
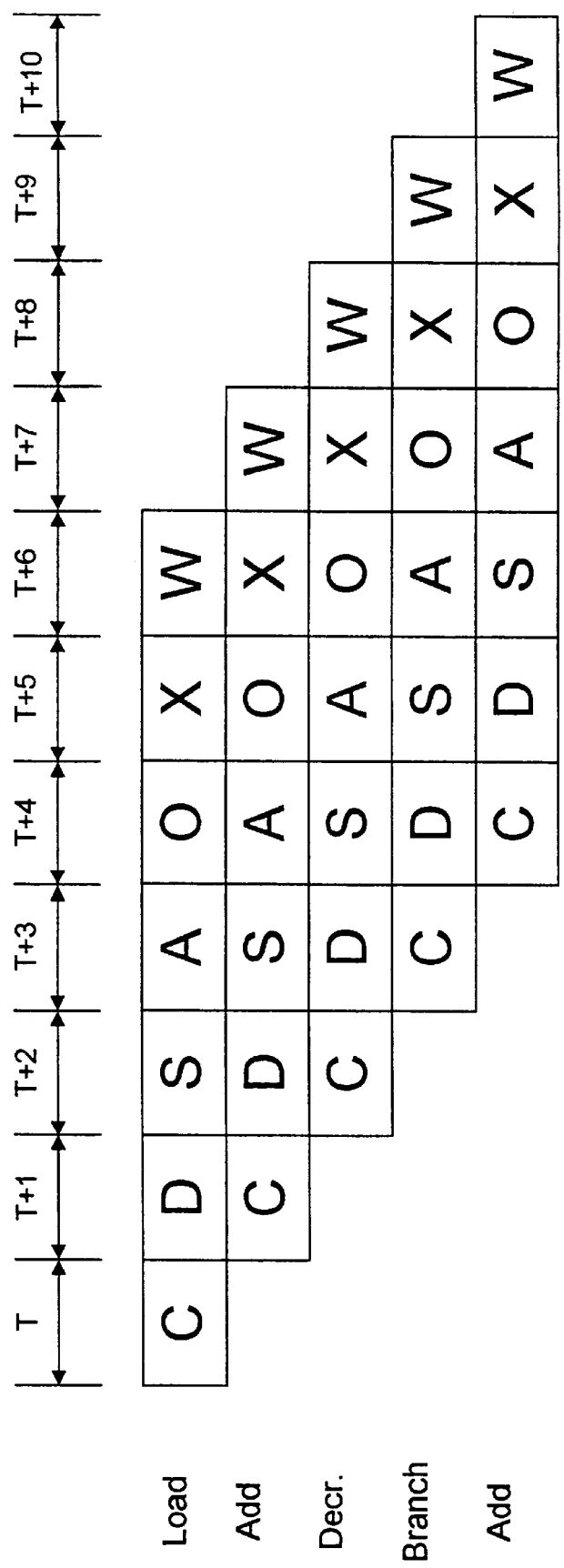
FIG. 6 shows the contents of different stages of a computer pipeline running the computer program as shown in FIG. 5.

FIG. 6 shows the contents of different stages of the instruction pipeline stages as the instructions in the program in FIG. 5 flow through the processor. The instruction flow illustrated in FIG. 6 assumes that instruction are fetched one-by-one and, most importantly, there are no pipeline stalls in this example.

As shown in FIG. 6, during the clock cycle T, the processor performs instruction fetching for the LOAD instruction. At the end of the clock cycle T, the LOAD instruction moves into the instruction decode stage (i.e. D stage) and the processor simultaneously moves the ADD instruction to the instruction fetch stage (i.e. C stage). Therefore, during the clock cycle T+1, two level processing pipeline is created (i.e. LOAD instruction in the instruction decode stage; ADD instruction in the instruction fetch stage). Similarly, at the end of the clock cycle T+2, the processor simultaneously (1) moves the LOAD instruction into the instruction issue stage (i.e. S stage) from the instruction decode stage; (2) moves the ADD instruction to the instruction decode stage (i.e. D stage) from the instruction fetch stage (i.e. C stage); and (3) moves the DECR instruction to the instruction fetch stage (i.e. C stage). Therefore, during the clock cycle T+3, three level processing pipeline is formed (i.e. LOAD instruction in the instruction issue stage; ADD instruction in the instruction decode stage; and DECR instruction in the instruction fetch stage). Similarly, at the end of the clock cycle T+2, each instruction (i.e. LOAD, ADD, and DECR) in the processing pipeline advances one stage. Furthermore, the BRANCH instruction enters the C stage of the processing pipeline at the end of clock cycle T+2.

At the end of the clock cycle T+3, the processor must make a branch prediction to predict the outcome of the BRANCH instruction and generate the address for the next instruction to enter the processing pipeline. In the best case scenario as shown in FIG. 5, the time for processing different substages in a branch prediction process such as determining the branch instruction outcome, generating the predicted instruction address, and fetching the instruction is within one clock cycle so that the ADD instruction is allowed to enter the C stage one cycle after the BRANCH instruction. In this case, there is no timing "hole" located between the two instructions (i.e. no pipeline stall).

Figure 7:
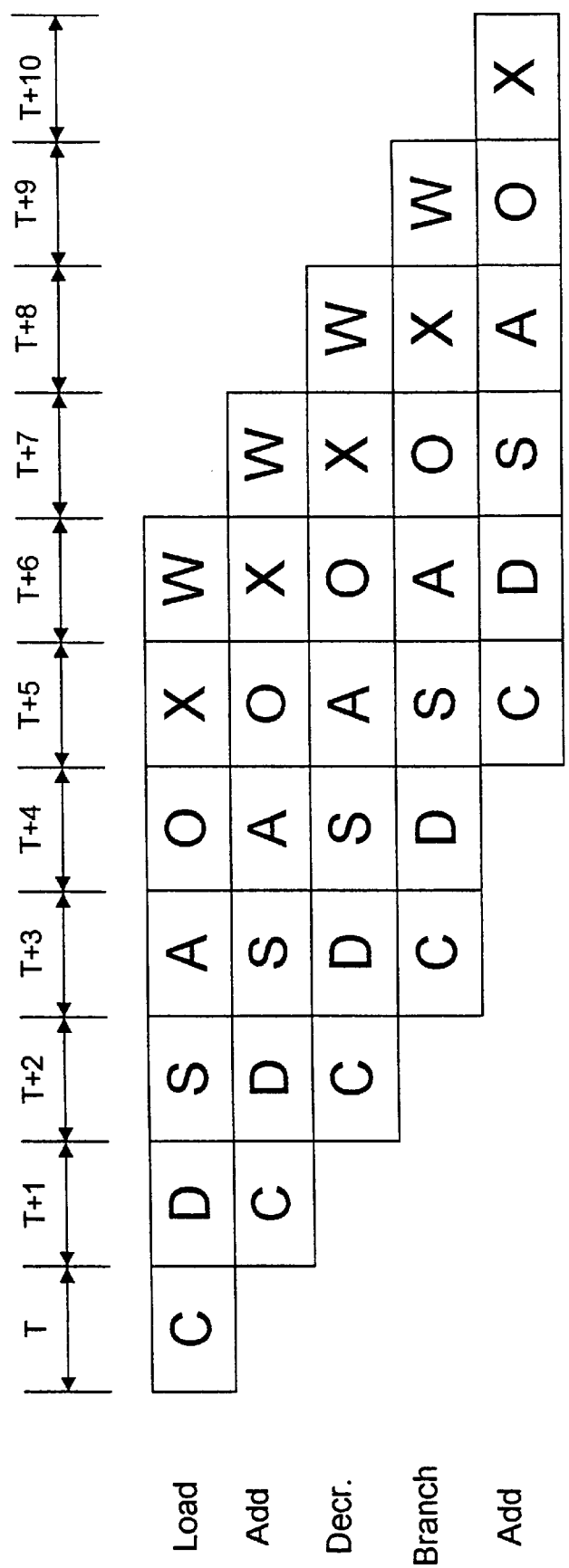
FIG. 7 shows the contents of different stages of the computer pipeline running the computer program as shown in FIG. 5, having pipeline stall.

FIG. 7 illustrates a pipeline stall problem occurred within the processing pipeline caused by the time required to process the above-mentioned branch prediction substages. Because of the different substages involved in handling the branch prediction, some conventional processor designs require more than one clock cycle to complete different substages of the branch prediction. The processor is, therefore, stalled during this additional clock cycle(s) waiting for the branch prediction to be completed. Therefore, "holes" in the processing pipeline are created (i.e. pipeline stall). These holes are highly undesirable and affect the efficient of the pipeline. Because of the pipeline stall, the instruction fetch stage of the ADD instruction cannot begin until the clock cycle T+5. This delay creates a timing hole of at least one clock cycle in the processing pipeline. The pipeline stall as shown is between the completion of the C stage of the BRANCH instruction and the beginning of the ADD instructions (i.e. clock cycle T+4). It should be noted that this delay is independent of whether the branch prediction is correct or not. In addition, the accumulative effect of this delay is greatly amplified in short loop programs because, as shown in the present example, the branch prediction decision happens one in every four clock cycles which thereby causes the delay of one clock cycle in every four clock cycles.

Figure 8:
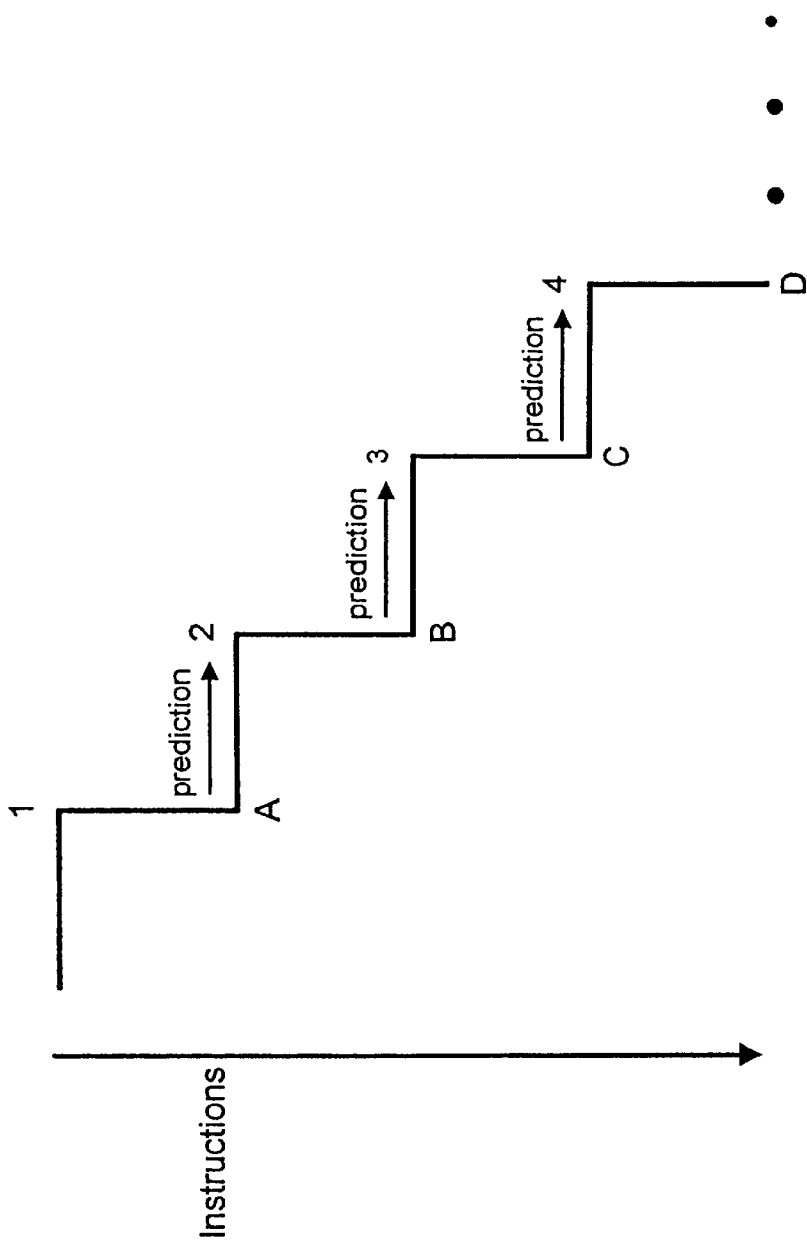
FIG. 8 shows an instruction flow diagram of the conventional designs.

FIG. 8 is a diagram showing instruction processing in a conventional branch prediction system. As shown in the figure, instructions are processed downwardly from the top to the bottom. Specifically, instructions are processed beginning at point 1 and continuing to point A. In this example, a branch instruction is encountered at point A. When the branch instruction is encountered, the BTB table is accessed and compared. If a branch "Take" decision is made, a predicted instruction address (i.e. Point 2) is generated and provided to the processor for instruction fetch. The predicted instruction address is then fetched and moved through the processing pipeline as shown in FIG. 2. Similarly, when point B is reached, the branch prediction mechanism will generate the predicted target instruction address at point 3.

The branch condition is resolved when the branch instruction is executed (i.e. X stage). If the branch prediction is found to be correct, the instruction processing will be continued and uninterrupted. However, if the predicted condition is found to be incorrect, the entire sequence of instructions following the branch predicted instruction address will be flushed.

As discussed in the previous paragraphs, the branch prediction mechanism of the conventional design as shown in FIG. 8 faces a variety of timing problems because of the time required to perform different substages of the branch prediction. Therefore, in some conventional designs, the branch prediction process creates pipeline "holes" whenever a branch instruction prediction is needed (e.g. point A, B, C, and D, etc.). These pipeline stalls tremendously lower the efficient of the processing pipeline when the branch instructions are frequently processed such as the small loop program as illustrated in FIG. 7.

Figure 9:
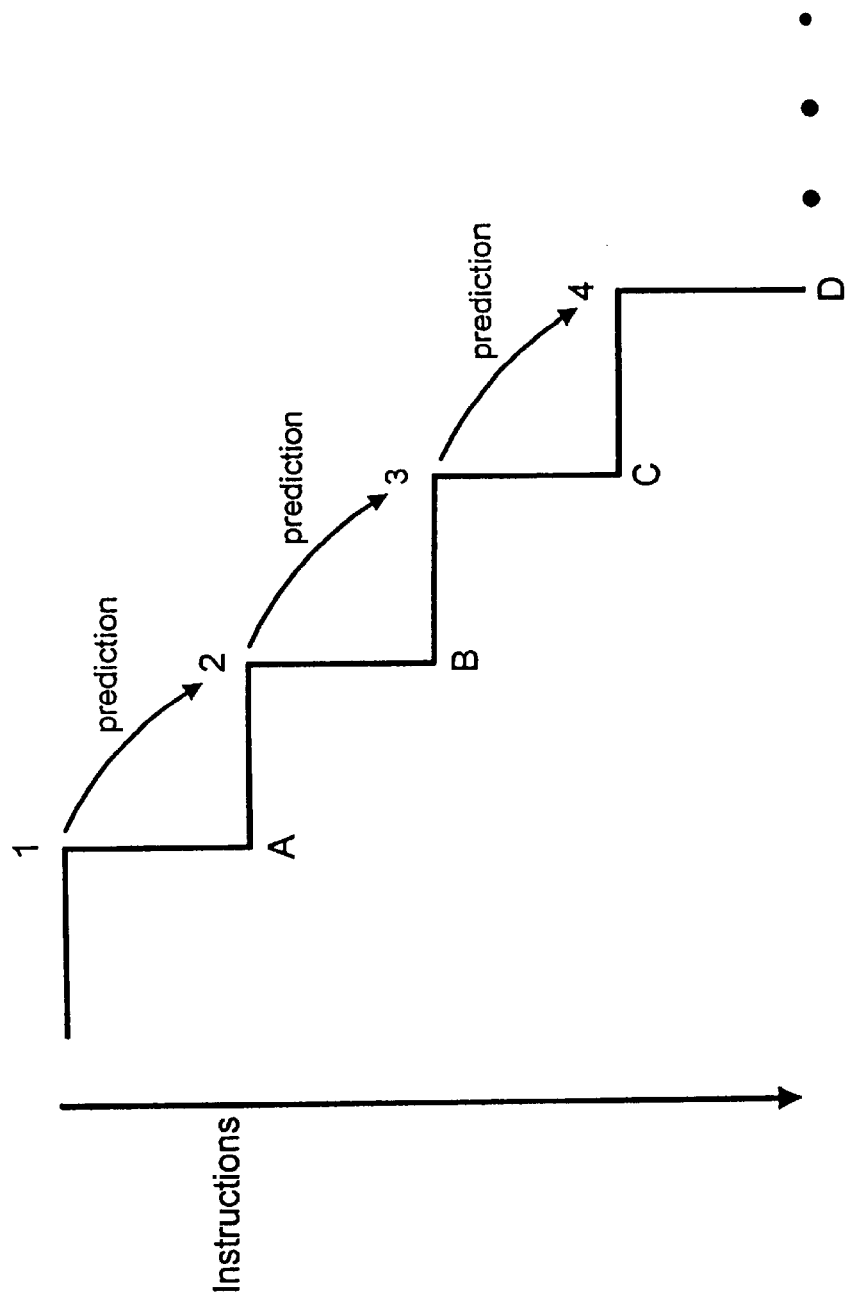
FIG. 9 shows an instruction flow diagram of an embodiment of the present invention.

FIG. 9 conceptually illustrates the improved design of the branch prediction mechanism of a preferred embodiment of the present invention. Similar to FIG. 8, instructions are processed in a vertical fashion. In addition, the branch instructions are similarly located at point A, B, C, and D, etc. However, instead of predicting the branch target address until the branch instructions are processed (i.e. at points A, B, C, and D, etc.), the branch prediction mechanism of the present invention predicts the outcome of the next possible branch instruction when a jump instruction is just taken. In other words, the branch prediction mechanism of the present invention performs the branch prediction for the next possible branch instruction when the processor begins to process the instruction of the just taken jump target address (e.g. points 1, 2, 3, and 4, etc.).

In the preferred embodiment of the present invention, the information stored in each BTB table includes the current just taken jump target address, next possible branch instruction address, target address for the next possible branch instruction, and prediction value so that the processor can check the BTB table and predicts the branch target address for the next possible branch instruction.

As shown in FIG. 9, when the just taken jump target instruction is hit (e.g. points 1, 2, 3, and 4, etc.), the processor will access the BTB table and compare the current address with the just taken jump target address to determine whether an entry is available in the BTB table. If an entry is hit, the corresponding prediction value is obtained from the BTB table, and the branch prediction for the corresponding next possible branch instruction is evaluated. If a jump is predicted, the corresponding (1) next possible branch instruction address; and (2) next jump target address are obtained and stored.

In other words, the present invention predicts (1) the next possible branch instruction; and (2) the corresponding next target instruction address. By advance predicting the target address for the next possible branch instruction at the just taken jump target address (e.g. point 1), the present invention provides tremendous benefit in timing flexibility for completing the next branch prediction procedure. Therefore, the present invention allows additional clock cycle(s) for the prediction process to complete (i.e. from the just taken jump target address to the next branch instruction address) so that more time is available for the processor to complete all the branch prediction substages, which includes matching, reading and evaluating entries from the BTB table.

In addition, FIG. 9 also illustrates another important aspect of the present invention. Because of the ability to predict the corresponding next target instruction address for the next possible branch instruction, the branch prediction mechanism of the present invention can also perform a subsequent branch prediction even before the next possible branch instruction is reached. For example, in FIG. 8, using the predicted branch target address of point 2, the branch prediction mechanism can also predict the next next possible branch instruction at point B and generates the next next jump target address of point 3. After obtaining the next jump target address (i.e. address of point 2) from the BTB using the current just taken jump target address (i.e. address of point 1), the branch prediction mechanism simply accesses the BTB again using the next jump target address of point 2 as the tag entry. Thus, the next next possible branch instruction address (i.e. address of point B) and the next next jump target address of point 3 can be generated. Similarly, by repeating this process, the subsequent jump target address (es) (e.g. point 4) can be produced by accessing the BTB again.

Figure 10:
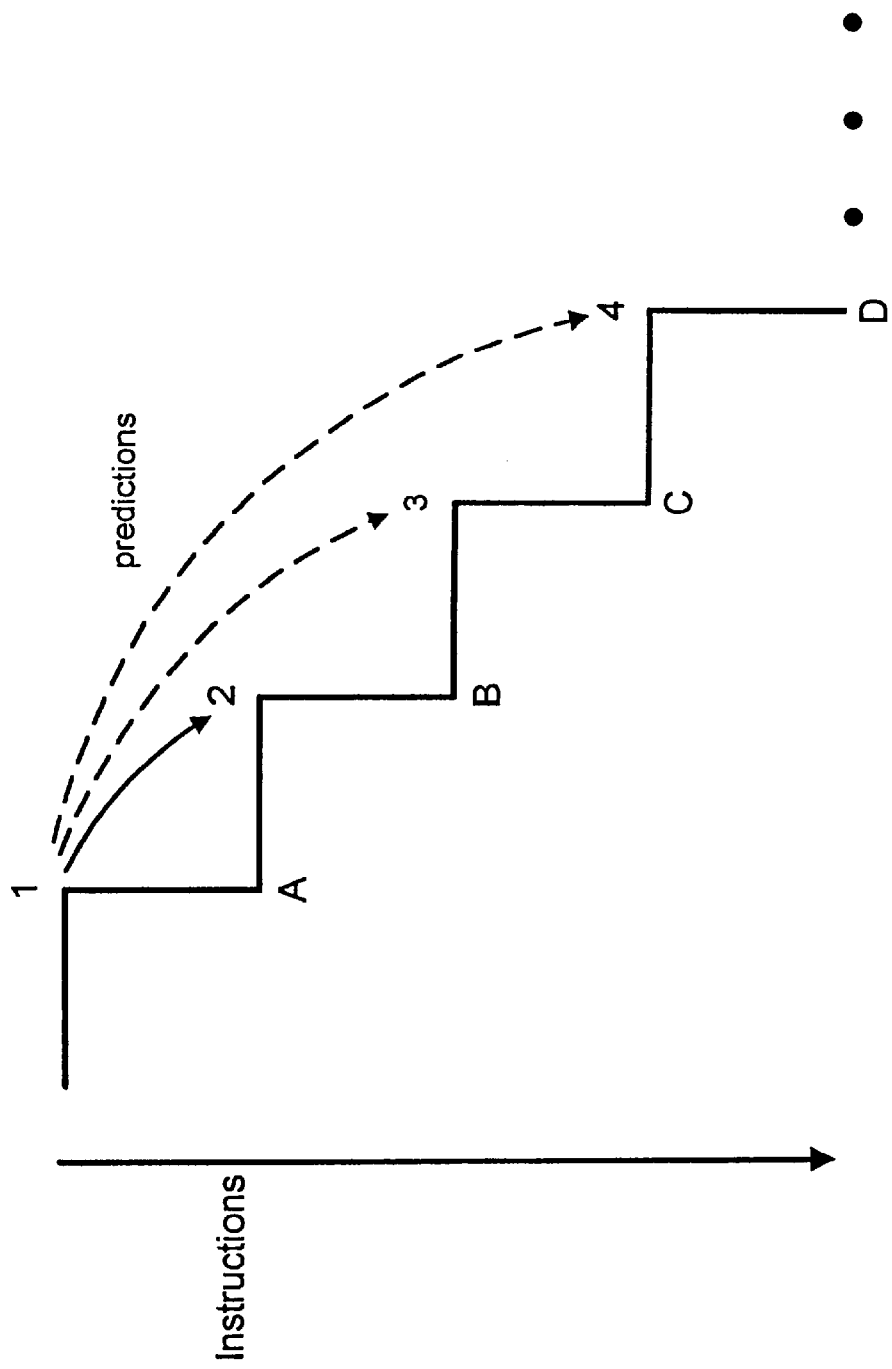
FIG. 10 shows an instruction flow diagram of another embodiment of the present invention.

FIG. 10 illustrates yet another aspect of the present invention. Under this aspect of the present invention, the branch prediction mechanism can perform branch predictions for both the next possible branch instruction and the next next possible branch instruction with only one access to the BTB table. By simply expanding the BTB entry to include the next next jump target address, this prediction (i.e. prediction for the next next possible branch instruction) can be made by reading the additional entries from the BTB table, assuming the next possible branch instruction jump is taken.

For example, when the just taken jump target address is processed at point 1, the branch prediction mechanism of the present invention simultaneously predicts the target addresses for both branch instructions at point A and point B by reading only one BTB entry from the table. By including both next jump target address and the next next jump target address in each BTB entry, the prediction mechanism can predict both the output of the next possible branch instruction at point A and the outcome of the next next possible branch instruction at point B. Therefore, both the next jump target address (i.e. point 2) and the next next jump target address (i.e. point 3) can be generated.

This additional information (i.e. the next next possible branch instruction, and the next next jump target address) is provided by adding different entries of the BTB table. By expanding each entry of the BTB table to include this information, the present invention can extend the prediction mechanism to multi-level branch instruction prediction. For example, a third level prediction can also be implemented with further expanding the BTB table. It is true that the further the predictions, the less possibility of being correct on the every predicted branch instructions. It should be noted that this aspect of the invention does not incur any performance delay to the processing pipeline even if the predictions are eventually not taken. If the prediction is incorrect, the entire predicted sequence of instructions will be flushed out as with the conventional designs. The cost of this aspect of the present invention is only the increasing in the number of BTB entries for storing all these extra addresses and prediction values. In addition, additional hardware is also required to implement this aspect of the present invention.

FIG. 11 shows a simplified conventional BTB table. Each line of the BTB table comprises the following entries: TAG portion storing the branch instruction addresses; target address portion storing the next target address; and prediction value portion storing the prediction characteristics of the corresponding branch instruction.

As discussed above, the TAG area of the BTB table comprises either the full instruction address or a portion of the instruction address. The design of the TAG is well known in the art and will not be explained in detail here. Similarly, the target address stores either the full target address or a relative target offset relative to the tag address. Finally, the prediction value portion provides information on whether a branch jumping history of the corresponding branch instruction. The prediction mechanism can be designed either dynamically or statically as discussed in the previous paragraphs.

FIG. 12 shows a BTB table implementing the present invention. This improved BTB table differs from the convention design mainly in two areas: (1) the TAG portion, instead of storing the branch instruction addresses, stores the just taken jump target addresses, and (2) extra field of the next possible branch instruction address. Both the next branch target address and the next possible branch instruction portion can store only relative addresses or full addresses.

As mentioned above, the BTB table of the present invention can be expanded further to implement the additional aspect of the present invention as shown in FIG. 9. In this embodiment (not shown in the figure), the BTB table is further expanded to include multiple next possible branch instruction addresses (e.g. BrchAdd1, and BrchAdd2), multiple next branch target addresses (e.g. TarAdd1, and TarAdd2), and multiple prediction values (e.g. Val1, and Val2).

For example, assuming the BTB contains an entry for the taken jump target instruction at point 1 created by prior jumping of a branch instruction which jump target address is at point 1. In the present example, two level branch prediction values are created and stored in an BTB entry by previously processing the same taken jump target instruction. The BTB table entry of point 1 comprises a TAG portion indicating the address at point 1, a BrchAdd1 portion indicating the address at point A, a TarAdd1 portion indicating the address at point 2, a BrchAdd2 portion indicating the address at point B, a TarAdd2 portion indicating the address at point 3, Val1 showing the prediction value of the branch instruction at point A, and Val2 showing the prediction value of the branch instruction at point B. By accessing this TAG entry, the history of the next possible branch instruction and the next next possible branch instruction can be determined.

As discussed in the previous paragraphs, each of the addresses stored in different portions of each BTB entry can be either an absolute address or a relative offset to the tag address.

Figure 13:
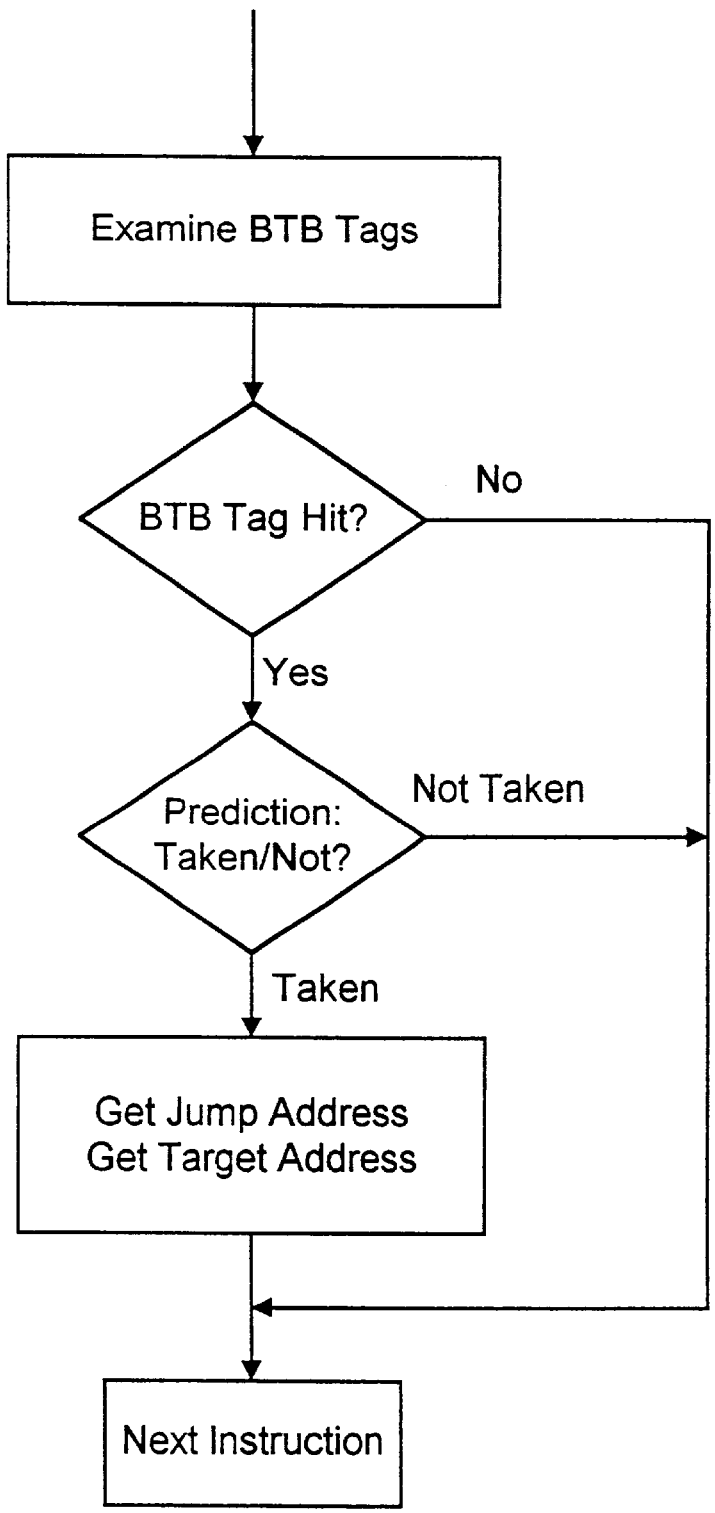
FIG. 13 shows a flow chart of an embodiment of the present invention.

FIG. 13 shows a flow chart of the present invention for obtaining branch instruction information immediate after a previous branch instruction jump is processed. As shown in the flow chart, the current instruction address (i.e. the jump target address for the previous branch instruction jump address) is first compared with all the TAGs entries of the BTB table to determine whether there is any match to the BTB table. If the current instruction address matches any one of the TAG entries in the BTB table, the corresponding next possible branch instruction address(es) and the next jump target address(es) in that BTB entry will be read and/or calculated. The prediction value of the next possible branch instruction is then evaluated. If a branch jump is predicted, these two addresses (i.e. the corresponding next possible branch instruction address, and the next jump target address) will be stored for use in the next address comparison steps as illustrated in FIGS. 14 and 15.

Figure 14:
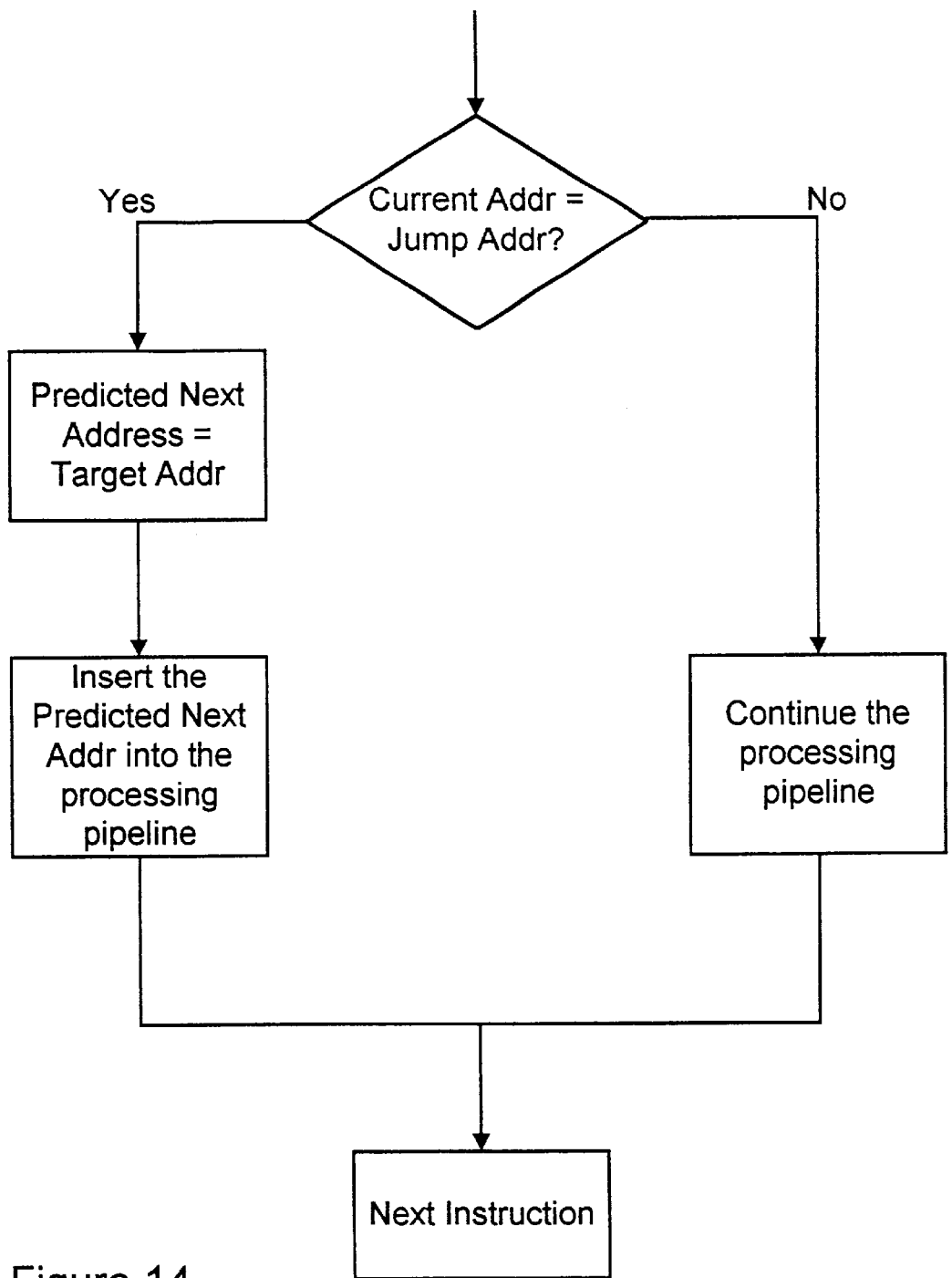
FIG. 14 shows another flow chart of the embodiment of the present invention.

FIG. 14 shows a flow chart of handling the branch instruction of the present invention. Each instruction address from the instruction stream will be compared with the next possible branch instruction address generated and stored in the previous step. If the current instruction address equals to the next possible branch instruction address stored, the predicted next instruction address will be assigned with the next jump target address stored. Then the processing pipeline will continue processing at the predicted next instruction address after the next possible branch instruction address so that no interruption will be in between these two instructions. If the current instruction address does not equal to the next possible instruction address, the processor will continue the normal instruction processing.

Figure 15:
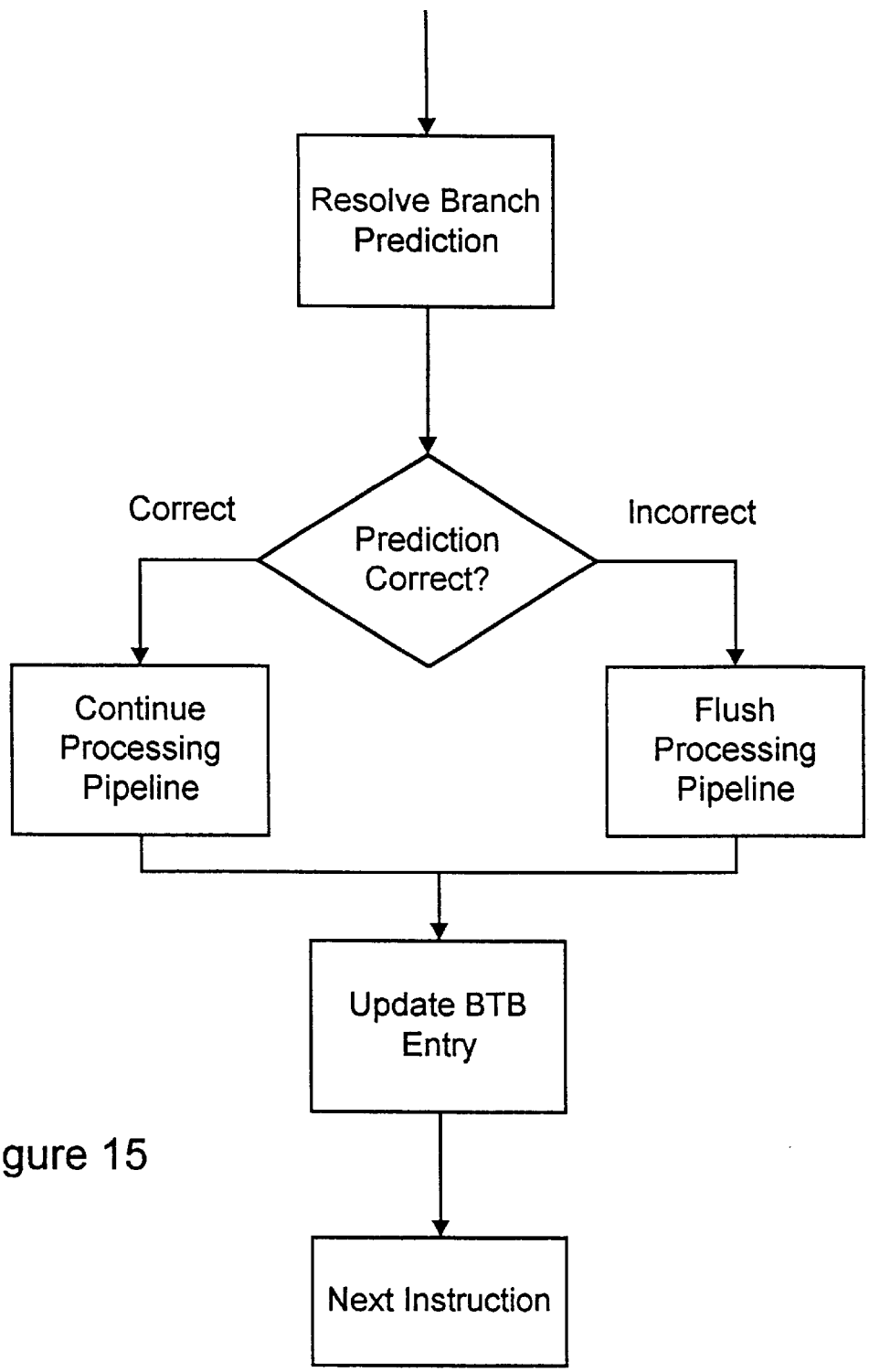
FIG. 15 shows yet another flow chart of the embodiment of the present invention.

FIG. 15 is a flow chart of a preferred embodiment of the present invention showing when a branch prediction is resolved. As shown in the flow chart, the branch prediction is eventually resolved in stage X. If the prediction is corrected, the processing pipeline will continue to run without any interruption. However, if the prediction is incorrect, the entire processing sequence after the branch instruction will be flushed out. That is, all the instructions beginning at the mispredicted next jump target address will be flushed from the processing pipeline(s). Finally, the BTB table will be updated to reflect the most current branch prediction result.

Figure 16:
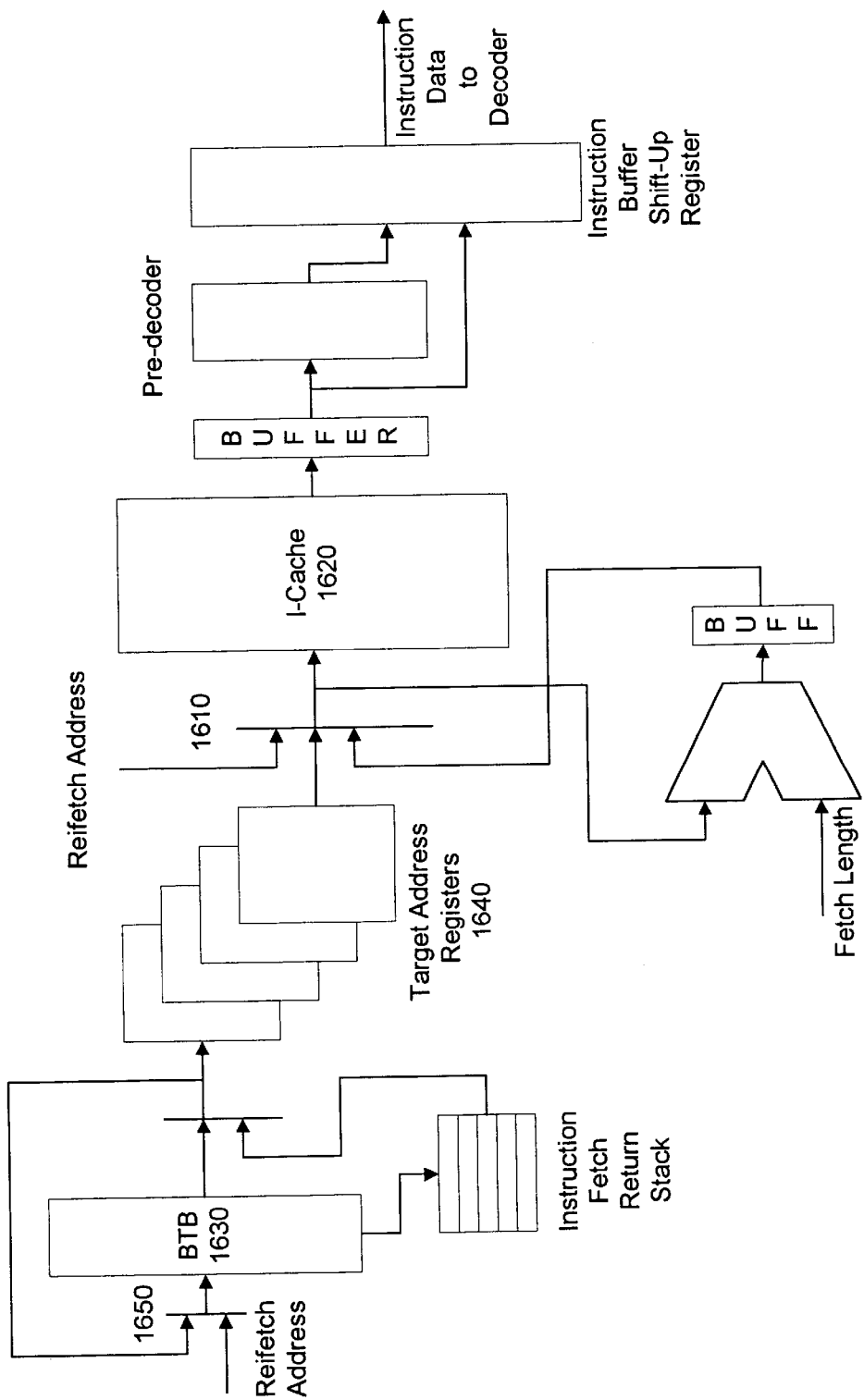
FIG. 16 shows a block diagram of an branch prediction mechanism of a preferred embodiment of the present invention.

FIG. 16 shows a block diagram illustrating one implementation of the present invention.

As shown in the figure, an Reifetch Address is provided to the instruction processing system at the beginning of the instruction fetching process. The Reifetch Address is provided to two locations: (1) to the BTB table 1630 for determining whether it matches any entry in the BTB; and (2) to the Multiplexer 1610 for accessing the instruction cache 1620.

When the Reifetch Address matches any entry in the BTB table 1630, a predicted jump target address is determined and stored in one of a plurality of target address registers 1640. It should be pointed out that, in the present invention, the predicted jump target address is then fed back to the Multiplexer 1650 to be selected to match with the entries in the BTB table 1630. By matching the predicted jump target address with the BTB entry, the present invention as illustrated in the conceptual diagrams of FIGS. 9 and 10 are implemented: comparing the just predicted jump target address with the entry of the BTB table so that the next possible branch instruction address and the next jump target address can be predicted and generated.

In addition, the Multiplexer 1610 is used to select whether (1) the predicted jump target address; (2) the Reifetch Address; or (3) an incremented current address should be provided to the instruction cache for cache fetching. In this preferred embodiment, the multiplexer 1610 is controlled by the branch prediction mechanism (not shown in the figure).

In the present invention, when the Reifetch address does not match any entry in the BTB table 1630, the Multiplexer 1610 is then selected to allow either a new Reifetch address or an incremented present instruction address for accessing the instruction cache memory 1620. Finally, the fetched instruction is processed by a predecoder (optional) and held in an instruction buffer shift-up register (optional) for sequential processing.

It is to be understood that while the invention has been described above in conjunction with preferred specific embodiments, the description and examples are intended to illustrate and not limit the scope of the invention, which is defined by the scope of the appended claims.

What is claimed is:

1. An instruction processing apparatus for predicting a jump target location of a next possible branch instruction location following a current instruction supplied in a sequence of instructions, said apparatus comprising:

at least one processing mechanism configured to receive and process said sequence of instructions;

a controller configured to associate said sequence of instructions with said processing mechanism; and a branch prediction mechanism configured to provide the next possible branch instruction location and the jump target location of the next possible branch instruction using the current instruction, wherein said branch prediction mechanism provides said next possible branch instruction location and jump target location simultaneously with the processing of said current instruction.

2. The apparatus according to claim 1, wherein each of said at least one processing mechanism is a pipeline processor.

3. The apparatus according to claim 1, wherein said instruction processing apparatus is in a microprocessor.

4. The apparatus according to claim 1, wherein said next possible branch instruction is a subsequent branch instruction that is predicted to be taken.

5. The apparatus according to claim 4, wherein said current instruction is a jump target instruction of a previous branch instruction.

6. The apparatus according to claim 1, wherein said current instruction is a jump target instruction of a previous branch instruction.

7. The apparatus according to claim 1 or 5, said branch prediction mechanism comprising:

a branch target buffer having at least one buffer entry comprising a TAG portion, a next possible branch instruction portion, and a jump target location portion.

8. The apparatus according to claim 6, wherein said current instruction address is compared with said TAG portion of said buffer entry, when the current instruction address matches the TAG portion of any of said buffer entry, the next possible branch instruction portion of the corresponding buffer entry is provided as said future branch instruction and said jump target location portion of the corresponding buffer entry is provided as said jump target location.

9. The apparatus according to claim 8, wherein each of said buffer entry further comprises a prediction value.

10. The apparatus according to claim 9, wherein said branch target buffer comprises more than one buffer entries.

11. A method of processing instructions supplied from a sequence of instructions in an instruction processing mechanism having a branch target buffer, said branch target buffer having at least one buffer entry, each of said at least one buffer entry comprising a TAG portion, a next possible branch instruction portion, and a jump target location portion, said method comprising:

providing a current instruction address from said sequence of instructions to an instruction controller;

matching said current instruction address with the TAG portion of each of the buffer entry, and if said current instruction matches one of the TAG portion of the buffer entry, predicting a jump target location of a next possible branch instruction, wherein at least a portion of at least one of said providing, matching and predicting steps is performed simultaneously with a processing step for processing said current instruction.

12. The method according to claim 11, wherein said next possible branch instruction is a subsequent branch instruction that is predicted to be taken.

13. The method according to claim 12, wherein said current instruction is a jump target instruction of a previous branch instruction.

14. The method according to claim 11, wherein said current instruction is a jump target instruction of a previous branch instruction.

15. The method according to claim 11 or claim 13, wherein each of said buffer entry further comprises a prediction value.

16. The method according to claim 15, wherein said branch target buffer comprises more than one buffer entries.

17. A branch target buffer for assisting an instruction processing mechanism for predicting a jump target location of a next possible branch instruction following a current instruction supplied in a sequence of instructions, comprising:

at least one branch target buffer entry, each of said at least one branch target buffer entry comprising a TAG portion, a next possible branch instruction portion, and a jump target location portion, wherein each of said next possible branch instruction portion stores a branch instruction address following said current instruction in the sequence of instructions, said jump target location portion stores a jump target instruction address of the corresponding next possible branch instruction, and wherein said branch target buffer provides said next possible branch instruction location and jump target location simultaneously with a processing of said current instruction.

18. The branch target buffer according to claim 17, wherein said next possible branch instruction address is an address for a subsequent branch instruction that is predicted to be taken.

19. The branch target buffer according to claim 18, wherein said current instruction address is an address of a jump target instruction of a previous branch instruction.

20. The branch target buffer according to claim 17, wherein said current instruction address is an address of a jump target instruction of a previous branch instruction.

21. The branch target buffer according to claim 17 or claim 19, wherein each of said buffer entry further comprises a prediction value.

22. The branch target buffer according to claim 21, wherein said branch target buffer comprises more than one buffer entries.

23. An instruction processing apparatus for predicting a jump target location of a next possible branch instruction location following a current instruction supplied in a sequence of instructions, said apparatus comprising:

means for receiving and processing said sequencing of instructions;

means for associating said sequence of instructions with said means for receiving and processing; and means for providing the next possible branch instruction location and the jump target location of the next possible branch instruction using the current instruction wherein said branch prediction mechanism provides said next possible branch instruction location and jump target location simultaneously with the processing of said current instruction.

* * * * *